United States Patent
Wen et al.

(10) Patent No.: US 6,461,584 B1
(45) Date of Patent: Oct. 8, 2002

(54) PROCESS OF MAKING α-ALUMINA POWDER

(75) Inventors: Shaw-Bing Wen, Tainan; Chih-Peng Lin, Miaoli, both of (TW)

(73) Assignee: National Science Council, Taipei ( * ) Notice: Subject to any disclaimer, the term of this patent is extended or adjusted under 35 U.S.C. 154(b) by 14 days.

(21) Appl. No.: 09/636,744

(22) Filed: Aug. 11, 2000

(30) Foreign Application Priority Data

Aug. 16, 1999 (TW) .......................................... 88113929 A

(51) Int. Cl.$^7$ ................................................. C01F 7/02
(52) U.S. Cl. ........................................ 423/625; 423/626
(58) Field of Search ................................. 423/625, 626

(56) References Cited

U.S. PATENT DOCUMENTS 4,169,883 A   10/1979   Murrell et al.
5,417,956 A * 5/1995   Moser

FOREIGN PATENT DOCUMENTS

TW    175369    12/1991
TW    246668    5/1995

OTHER PUBLICATIONS

Langdon, Ceramics Intn'l, vol. 19, "Superplastic–like Flow in Ceramics: Recent Developments . . .", pp. 279–286, 1993, No month.

Hart, Editor, Alumina Chemicals Science and Technology Handbook, "History of Alumina Chemicals", pp. 1–6, No date.

Zhou et al, Acta Cryst., B47, "Structures and Transformation Mechanisms of the . . . ", pp. 617–630, 1991, No month.

Maher et al, Amer. Ceramic Society Bulletin, "Preparation and Characterization of Ceramic Fine . . . ", pp. 72–76, May, 1993.

Maher et al, Jour of Materials Proc Tech, vol. 56, "Preparation and Characterization of Ceramic . . . ", pp. 200–210, 1996, No month.

Napper, Polymeric Stabilization of Colloidal Dispersions, "Basic Concepts of Stability", pp. 8–16, 1983, No month.

Wefers, Technical Paper, "Nonmenclature, Preparation, and Properties of Aluminum Oxides . . . ", pp. 13–22, 1972, No month.

* cited by examiner

*Primary Examiner*—Steven Bos
(74) *Attorney, Agent, or Firm*—Jacobson Holman, PLLC

(57) ABSTRACT

An admixture of hydrated alumina and an organic acid surfactant is calcined in an oxygen-depleted atmosphere, cooled before exposing it to air, comminuted and then centrifuged to produce nanometer-grade superfine α-alumina powder.

11 Claims, 5 Drawing Sheets

FIG:1

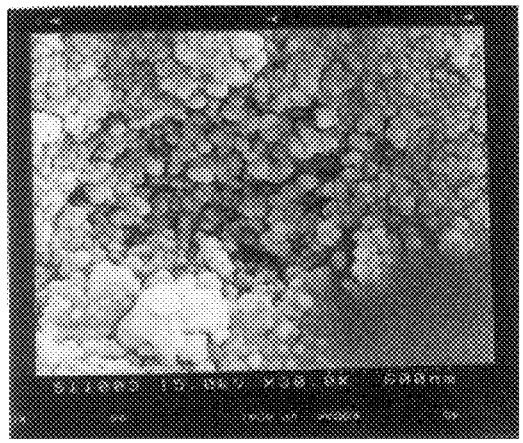
(a)
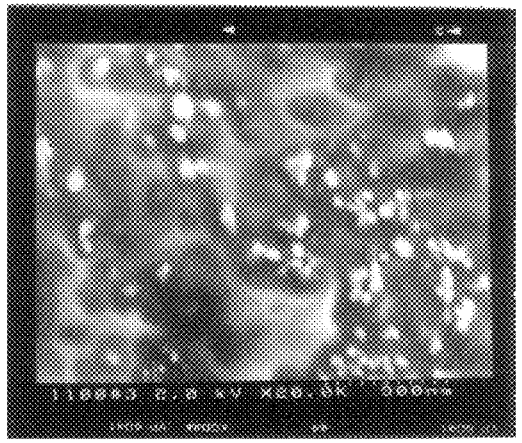
(b)
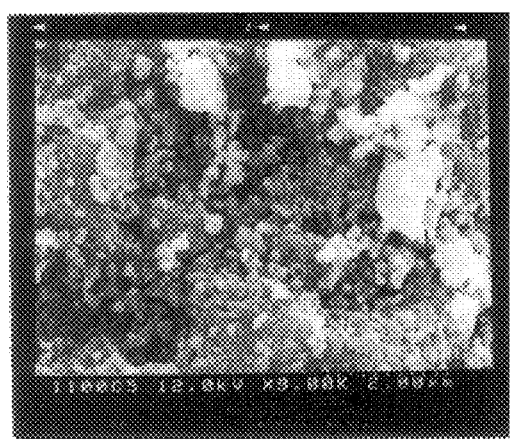
(c)
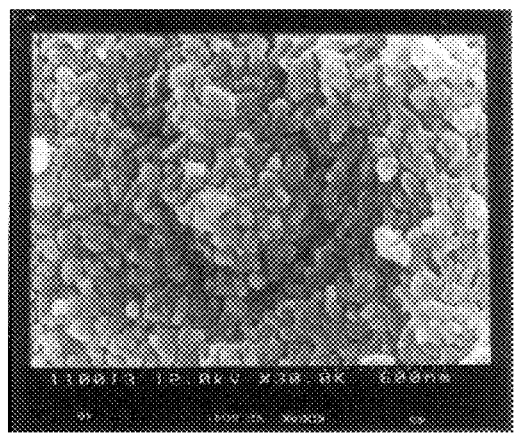
(d)
FIG : 3

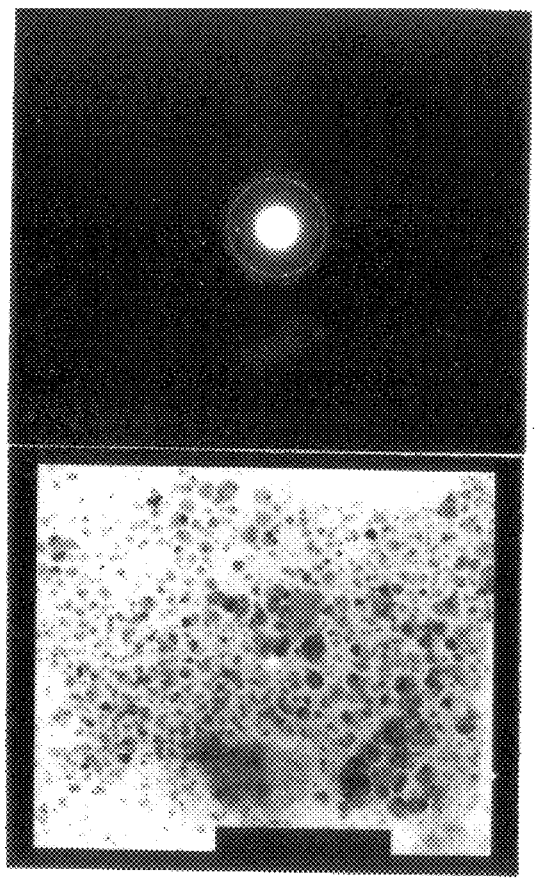
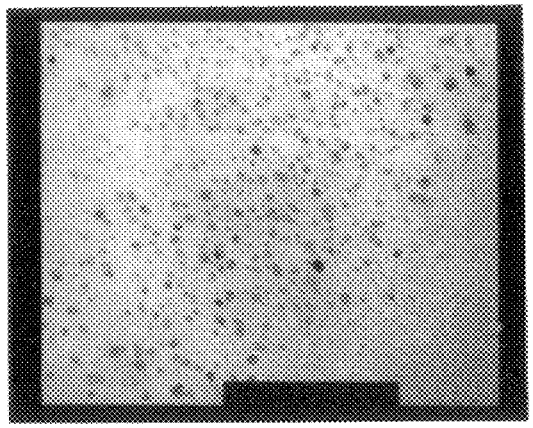
FIG:4

PROCESS OF MAKING α-ALUMINA POWDER

FIELD OF THE INVENTION

α-Alumina powder having a particle size of less than 60 nanometers is produced from hydrated alumina.

BACKGROUND

Alumina powders are used as polishing material in the manufacture of oxidized ceramics and silicone chips. The particle size of such powders has been decreasing from micrometer level to submicrometer level, and, lately, to nanometer level. At the nanometer level, as the interval between crystallites is reduced, the quantum dispersion during calcining is tighter. In addressing the issue, T. G. Langdon, Ceramic. Inter., Vol. 19, 279–286, 1993, indicated the temperature required for enhancing calcination rate and reducing sintering, which eventually expanded the scope of application to ceramics. Despite this, in manufacturing nanometer α-alumina, chemical co-precipitated alumina powder invariably sinters together in the calcination stage, making it impossible to obtain even finer superfine α-alumina.

PRIOR ART

Taiwan patents related to manufacturing superfine α-alumina powder are indexed under APIPA, including: U.S. Pat. No. 246,668, Submicrometer boehmite gel liquid; U.S. Pat. No. 175,369, Manufacturing process of α-Alumina from Alumina gel; and U.S. Pat. No. 4,169,883, Process for Preparing Ultra-stable High Surface Area Alpha-Alumina. In the most prevalent practice of using a chemical solvent to produce α-alumina, boehmite is the most common precursor. During heat treatment final stability is achieved through phase conversion. In recent years superfine polishing powders used for integrated circuits are primarily α-alumina. The need for even finer micro-particle polishing abrasives is due to the micro-development of products. For α-alumina as polishing material, the requirement is even finer than present production capability. This means that manufacturing nanometer grade abrasives is a key technology in the micro-development of integrated circuits.

SUMMARY OF THE INVENTION

High-sheer mixing boehmite with surfactant forms a micro-micelle, which is calcined at about 1,050° C. for approximately 30 minutes to produce α-alumina. The product is a black net-like fragile substance, residual carbon of which is burnt off after cooling to a temperature between 800° C. and room temperature. After deagglomeration treatment and centrifugal settling in a suitable liquid, α-alumina having a particle size of less than 60 nm is obtained.

S1100-5 Added oleic acid, temperature increased at a speed of 5° C./min to 1100° C. and held for 30 minutes G1100-5 No surfactant added, temperature increasing at a speed of 5° C./min to 900° C. and held for 30 minutes N1 Sodium oleate added, temperature increasing at a speed of 5° C./min to 900° C. and held for 30 minutes Δ (1) α-$Al_2O_3$

DETAILS

Superfine nanometric α-alumina powder is produced from aluminum nitrate, ammonia and alumina gel. As a precursor, boehmite is dispersed with a high speed mixer in surfactant organic solvent to produce a gel, which is calcined in an oxygen-depleted atmosphere. After cooling the calcined product, residual carbon is burnt off, and the resulting material is subjected to deagglomeration and centrifugation to produce α-alumina powder having particle sizes in the nanometer range. The boehmite gel is converted into a micro-micelle prior to calcination at α-temperature in the range of from 1,000° C. to 1,100° C. to produce α-alumina and to minimize sintering and agglomeration. The derived calcined product has a loose spongy structure of nanometric α-alumina powder with specific morphology. After deagglomeration treatment and centrifugal settling in a suitable liquid, nanometric α-alumina having a particle size of from 10 to 60 nm is produced. This product is useful as a superfine polishing material for micro-integrated circuits.

The surfactant employed is, e.g., a $C_{12-29}$ organic acid, such as oleic acid, which is a $C_{18}$ unsaturated acid. When oleic acid is used, the acid to gel volume is greater than 1:2 to 3:1, which corresponds to a weight ratio of greater than 1.7:1. The oleic acid/gel admixture is a pale yellow emulsion. Calcination is effected in an oxygen-depleted atmosphere in a kiln, the temperature of which is increased at a rate of from 5° to 10° C. per min up to 1,050° C., and held at that temperature for 30 minutes to produce α-alumina. α-Alumina is obtained by calcining at a temperature in the range of from 1,050° to 1,100° C. for about 30 minutes. The α-alumina product is a black net-like fragile substance. The time for calcining should not be too long, preferably around 30 minutes.

Although reference has been repeatedly made to boehmite, other oxidized aluminum precursors suitable for this invention include bayerite, gibbsite, diaspore and pseudoboehmite.

Figure 1:
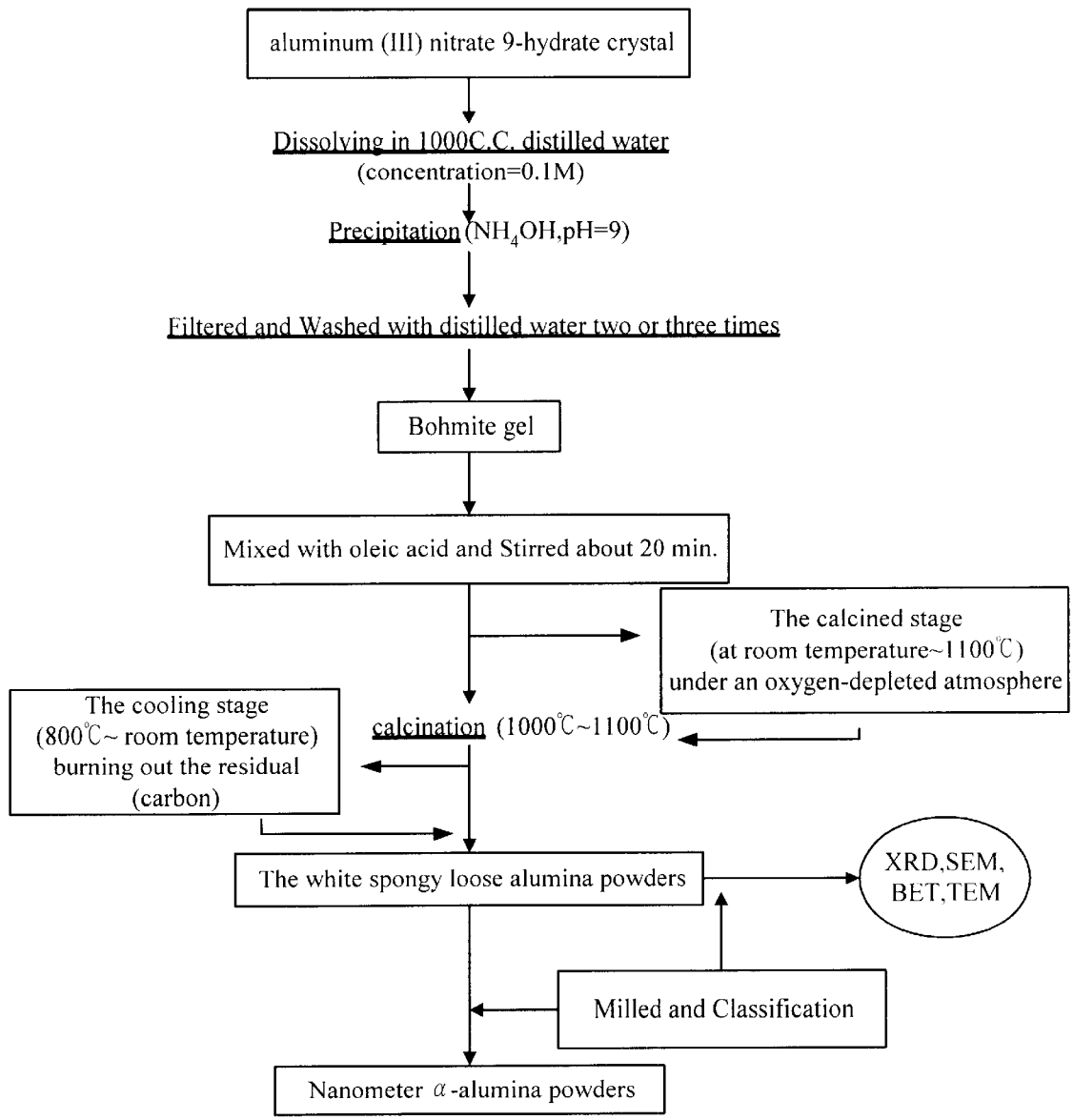
FIG. 1 is a flow diagram of the manufacturing steps.

With reference to FIG. 1, the starting materials are aluminum (III) nitrate 9-hydrate [$Al(NO_3)_3 \cdot 9H_2O$] in crystalline form (J. T. Baker), ammonia water (28%) (Santoku Chemical Company Ltd.) and oleic acid ($C_{17}H_{33}COOH$) (Katayama Chemical Company).

Boehmite gel—Dissolve 37.5 g aluminum (III) nitrate 9-hydrate crystals in 1000 ml of distilled water. Add ammonia water to the resulting solution (about 30 ml) to obtain an admixture having a pH of 9. Mix the admixture with magnetic stirrers at 25° C. Filter the obtained boehmite gelatinous precipitate, and wash it with distilled water two or three times. Do not allow the precipitate to dry completely by preventing it from being in contact with air for an extended period of time. The boehmite gel is referred to herein as the precursor.

Emulsion—A first stage comprises washing the precipitated boehmite gel two or three times with distilled water to remove ions. The moist gel is then peptized with an oleic acid solution. An optimum mass ratio of boehmite gel to oleic acid is (45~35):(55~65). The solution is prepared with a mechanic stirrer whereby the agitated boehmite gel in the presence of oleic acid forms a yellow emulsion, which is diluted by water of the boehmite gel.

Thermal procedure and analysis—Stable emulsion calcination is effected in an oxygen-depleted atmosphere at a temperature of from 1,000° to 1,100° C. in a kiln which is heated at a rate of from 5° C./min to 10° C./min. The calcining temperature is maintained for about 30 minutes before cooling the calcined material to a temperature between 800° C. and room temperature before exposing the calcined material to air. Such exposure results in burning off residual carbon. The oxygen-depleted atmosphere during calcination avoids forming hydrocarbon gases which lead to lost efficacy. The obtained crystalline alumina powder structures were characterized by X-ray diffraction (XRD) pattern with Cu $K_d$ radiation (Rigaku D/max III.V). Particle-size analysis of the powder was determined by BET (Micromeritics Gemini 2360) and transmission electron microscopy (TEM) (Hitachi Model HF-2000 Field Emission). The morphology of the powder was studied by scanning electron microscopy, and an energy dispersive spectrometer was used to analyze the element rate of a quenched sample in the calcined phase (SEM, Hitachi J-4200, field emission, addition EDS Noran model).

Figure 2:
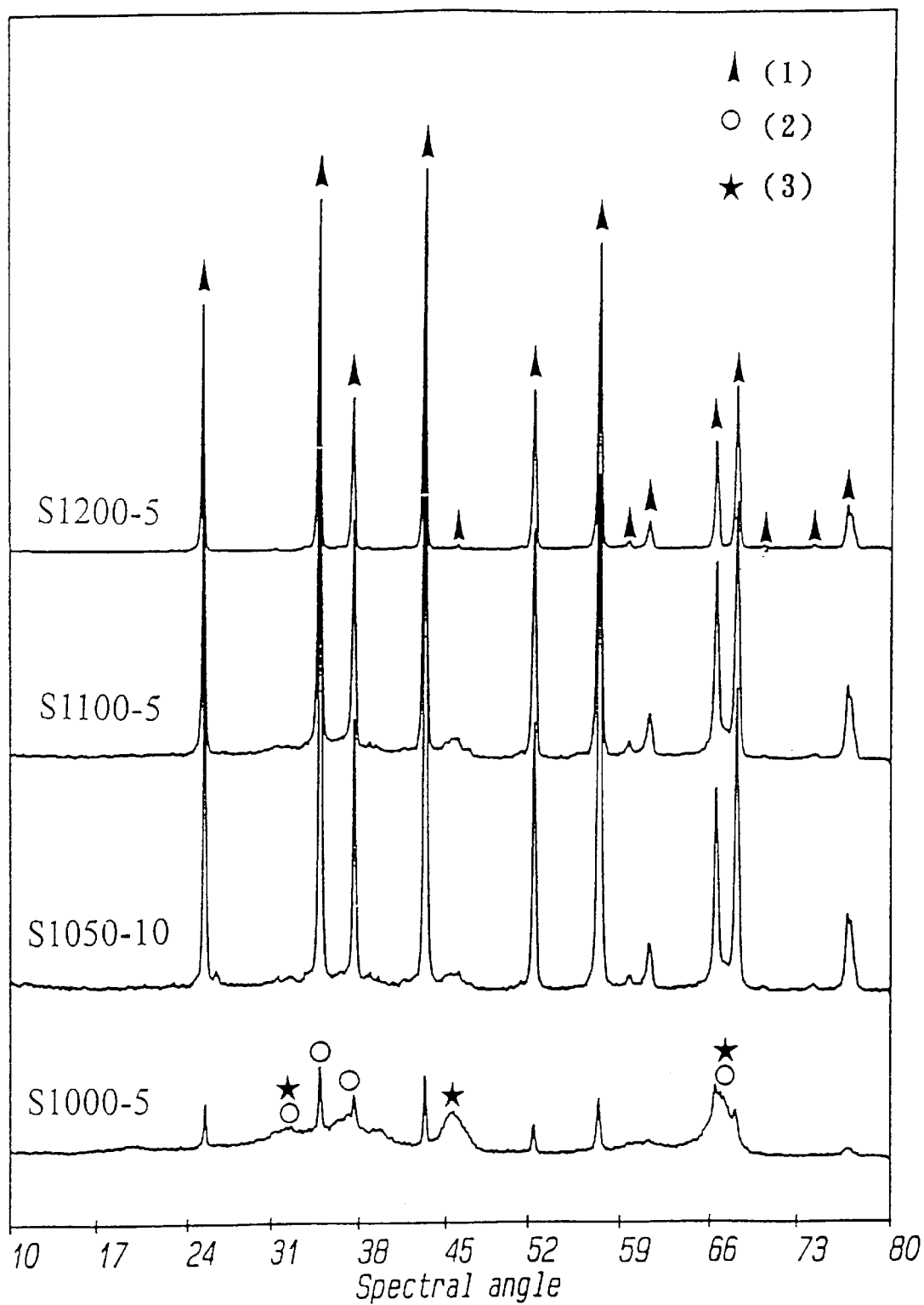
FIG. 2 is a Spectrum of powder XRD determination at different temperatures: (1) α-$Al_2O_3$, (2) θ-$Al_2O_3$, (3) δ-$Al_2O_3$ S1200-5—temperature increasing at a speed of 5° C./min to 1200° C. and holds for 30 minutes S1100-5—temperature increasing at a speed of 5° C./min to 1100° C. and holds for 30 minutes S1050-10—temperature increasing at a speed of 10° C./min to 1050° C. and holds for 30 minutes S1000-5—temperature increases at a speed of 5° C./min to 1000° C. and holds for 30 minutes FIG. 3 SEM photos of the surface of calcination at 1100° C. for 30 minutes FIG. 3(a) Photo of enlargement FIG. 3(b) SEM photograph of non-plated [Pt, Au] α-alumina FIG. 3(c) Improper heat treatment for partially sintered agglomeration FIG. 3(d) Improper heat treatment for completely sintered agglomeration FIG. 4 TEM photograph of α-alumina powders FIG. 4(a) Diffraction ring and Bright field FIG. 4(b) Photo of clear view (Bright field)

FIG. 2 is a spectrum of powder XRD determination at different temperatures. After analysis, the half peak width of the diffraction peak (012) is calculated by the Scherrer formula to have an average powder crystalline diameter in the 60 nm range. The surface space derived by BET is 22.67 $m^2/g$ (average diameter is 66.5 nm).

FIG. 3 is the SEM photo of the surface after calcination at 1,100° C. for 30 minutes. FIG. 3(a) is an enlarged photograph showing that superfine powders exist among block-shaped powders in loose bulk. FIG. 3(b) is an SEM photograph of non-plated [Pt, Au] α-alumina. FIG. 3(c) and 3(d) are photographs showing improper heat treatment or completely sintered agglomeration.

FIG. 4 is a TEM photograph of α-alumina powders ground and separated ultrasonically. FIG. 4(a) shows diffraction rings of multiple crystallites; the others are bright field photographs of clear views. From these photographs it is seen that particles of the powder have diameters as small as tens of nm.

The choice surfactant is an organic acid, primarily one having from 12 to 19 carbon atoms, such as oleic acid, which is an unsaturated $C_{18}$ acid, which is preferred. The main concern in selecting a surfactant is the cost factor. A comparative experiment was made with $C_{17}H_{33}COONa$, which resulted in sodium entering into the structure thus forming another non-α-alumina material. Therefore, ion type surfactants should be avoided to prevent additional substances entering into the structure during heat treatment.

The ideal calcination temperature is 1,100° C. because conversion of precursor into α-alumina is completed at that temperature. There is no significant variance from the rate in which the temperature is increased within the range of from 5° to 10° C. per minute. A more rapid rate of increasing the temperature leads to drastic surfactant boiling that can drive the gel to overflow the crucible in which it is being treated. In addition, the crucible is covered during calcination to control the oxygen-depleted atmosphere for combusting the organic acid compounds and isolating gel micelle from agglomerating. The cover is removed after cooling to 800° C. to burn out residuals.

After ball-grinding calcined powder, which can be used as a dispersion agent, and after ultrasonic treatment, the material is centrifuged for 40 minutes. The thus obtained top layer is α-alumina having a particle size of less than 60 nm.

EXAMPLE

Dissolve aluminum nitrate in distilled water to obtain a 0.1 M solution; add ammonia water to the aluminum nitrate solution to increase the pH to 9; after precipitation, filter; wash the precipitate twice with water; use ultrasound for 8 minutes in the last wash.

Mix 80 g of obtained filtered boehmite gel with oleic acid at a mixing speed of from 1,000~1,200 rpm (dehydration in the amount of about 30 ml $H_2O$ occurs); continue to add oleic acid in an amount of about half the volume of the gel (emulsion occurs). Continue to mix for 20 minutes; pour the resulting admixture into a crucible; place the crucible and contents in a high-temperature kiln and calcine in an oxygen-depleted atmosphere; increase the temperature in the kiln at a rate of from 5° C./min to 10° C./min; during heating, the crucible should be covered to prevent oxygen from entering; hold the temperature at about 1,0000 to 1,100° C. for 30 minutes to produce α-alumina. After cooling to 800° C., remove the cover. (When calcined at that temperature range for too long, α-alumina tends to have a vermicular or wormy structure.) Deagglomerate the spongy ivory substance obtained from the calcination ultrasonically or by grinding. Disperse the deagglomerated α-alumina in KOH (pH=10), and determine the particle size diameter of the obtained powder after centrifugal settling at a speed of 10,000 rpm for 40 minutes.

COMPARATIVE EXAMPLE

Following the same steps as in the Example, but separately (a) with a non-surfactant, (b) adding oleic acid, or (c) adding sodium oleate, to carry out the calcination; thereafter, grind ultrasonically or by machine; separately use KOH as a dispersion agent and centrifuge at a speed of 10,000 rpm for 40 minutes.

Figure 5:
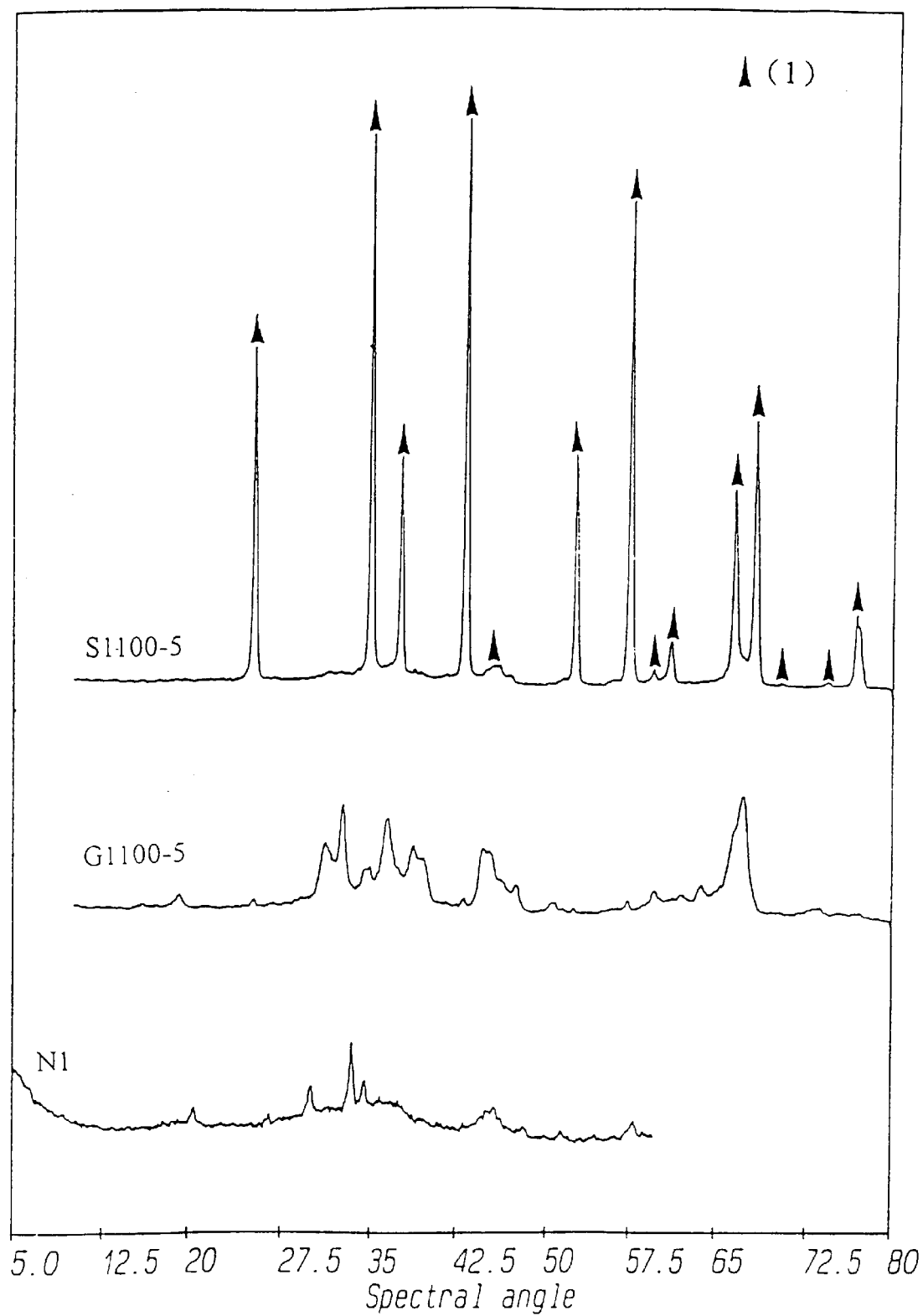
FIG. 5 Spectrum of powder XRD determination under different conditions

From the spectra of powder XRD determinations at different temperatures, as shown in FIG. 5, it is seen that N1 (with added sodium oleate) has interruption signals. G1100-5 without surfactant has $\alpha-Al_2O_3$, $\theta-Al_2O_3$, $\delta-Al_2O_3$. S1100-5 with oleic acid has a single phase of $\alpha-Al_2O_3$.

Similar surfactants obstruct particles of superfine powder from sintering together, resulting in steric stabilization. According to a report made by D. H. Napper, et al. in Academic Press London in 1983 and by P. C. Hiemenz, et al. in 1986 in Masrcel Dekker, the following functions are obtained:

(a) Volume restriction effect: when superfine powders are sintered together, the tail activity of the surfactant attached to the superfine surface is restricted, forcing a drop in conformation entropy. The system is able to rise freely; for the system to fall freely, intervals must be kept among the particles to prevent agglomeration;

(b) Osmotic effect: when two particles come together, the density of the surfactant attached to the two particles increases, and the system is able to rise up freely, enabling the molecules to enter into the area to reduce the density of the surfactant, causing the particles to separate.

(c) Depletion stabilization: This differs from steric stabilization in that stability is imparted not by attached polymer but rather by macromolecules that are free in solution. Investigations of this phenomenon, which was first studied experimentally in 1975 (Li-in-on et al., 1975) and theoretically in 1980 (Feigin and Napper, 1980b), are still in their infancy.

Based on the information published by K. Wefers, et al. in 12990, Am. Ceram. Soc., Inc., pp. 13–22, many original methods were available for conversion into α-alumina. Among which is the method of boehmite→γ-$Al_2O_3$→δ-$Al_2O_3$→θ-$Al_2O_3$→α-$Al_2O_3$ to produce α-alumina of final stability. Boehmite gel is the most common precursor.

The sequence of calcination must control the colloidal particles in surfactant (oleic acid) to maintain stability. It has been considered from two primary viewpoints: one is stabilized by adsorbed surfactant (steric stabilization) as a micelle chemical species, and the other considers it as a separate phase that uses high concentrations of nonadsorbing surfactant (depletion stabilization). The two mechanisms of stability, which control the colloidal particles (boehmite gel) during the calcining process, avoid excessive grain growth and advance the time of thermal transformation. The main emphasis is on producing a small crystallite size and controlling agglomeration.

What is claimed is:

1. A process for preparing superfine α-alumina powder which comprises the steps of:
   a) admixing an organic acid surfactant with hydrated alumina precursor in a high speed mixer to disperse the hydrated alumina throughout the surfactant,
   b) calcining the resulting dispersion in a kiln at a temperature in the range of from 1,000° to 1,100° C. in an oxygen-depleted atmosphere to produce α-alumina powder,
   c) cooling the powder to 800° C. before exposing it to air to combust remaining carbon,
   d) comminuting and then centrifuging the cooled powder to obtain nanometer-grade superfine α-alumina powder.

2. A process of claim 1 wherein the hydrated alumina precursor of step (a) is boehmite in gel form.

3. A process of claim 2 which further comprises washing the boehmite gel prior to step (a).

4. A process of claim 3 wherein the organic acid surfactant is a $C_{12-19}$ organic acid and the oxygen-depleted calcination is effected in an α-alumina or platinum crucible.

5. A process of claim 4 wherein the organic acid is oleic acid.

6. A process of claim 4 wherein the washed boehmite gel is subjected to ultrasonic treatment for from 5 to 10 minutes prior to step (a).

7. A process of claim 4 which further comprises waiting after step (a) until the admixture becomes pale yellow in color, and then continuing mixing for 20 minutes more.

8. A process of claim 7 wherein the gel volume in the pale yellow admixture is greater than 1:2 to 3:1, which corresponds to a weight ratio greater than 1.7:1.

9. A process of claim 7 wherein the kiln is heated at a rate of from 5 to 10° C. per minute to 1,050° C. and maintained at from 1,050° to 1,100° C. for about 30 minutes to obtain α-alumina as a loose spongy fragile substance.

10. A process of claim 9 which further comprises deagglomerating the loose spongy fragile substance in a ball grinder or with ultrasonic treatment.

11. A process of claim 10 which further comprises suspending the deagglomerated product in pure water, adding KOH thereto as a dispersing agent to separate loosely structured α-alumina, and centrifuging the thus-dispersed material to produce a layer of murky liquid comprising particles of α-alumina of less than 60 nm in size.

* * * * *